(12) United States Patent
McMahan et al.

(10) Patent No.: US 11,807,110 B2
(45) Date of Patent: *Nov. 7, 2023

(54) DUAL MODE COLLECTOR

(71) Applicant: TransTech of South Carolina, Inc., Piedmont, SC (US)

(72) Inventors: Travis McMahan, Honea Path, SC (US); William Golpe, Taylors, SC (US)

(73) Assignee: TransTech of South Carolina, Inc.

(*) Notice: Subject to any disclaimer, the term of this patent is extended or adjusted under 35 U.S.C. 154(b) by 169 days.

This patent is subject to a terminal disclaimer.

(21) Appl. No.: 17/501,631

(22) Filed: Oct. 14, 2021

(65) Prior Publication Data

US 2022/0032779 A1 Feb. 3, 2022

Related U.S. Application Data

(63) Continuation of application No. 16/235,548, filed on Dec. 28, 2018, now Pat. No. 11,173,791.

(51) Int. Cl.
*B60L 5/39* (2006.01)

(52) U.S. Cl.
CPC ............. *B60L 5/39* (2013.01); *B60L 2200/26* (2013.01)

(58) Field of Classification Search
CPC ...... B60L 5/39; B60L 5/00; B60L 5/04; B60L 5/08; B60L 5/10; B60L 5/12; B60L 5/16; B60L 5/28; B60L 5/30; B60L 5/32; B60L 5/36; B60L 5/38; B60L 2200/26
See application file for complete search history.

(56) References Cited

U.S. PATENT DOCUMENTS

| | | | | |
|---|---|---|---|---|
| 3,740,498 A | * | 6/1973 | Herbert | B60L 5/38 191/49 |
| 3,786,762 A | * | 1/1974 | Corkum | B60M 1/30 191/29 R |
| 7,188,716 B2 | * | 3/2007 | Lamschick | B60L 5/39 191/49 |
| 8,348,035 B2 | * | 1/2013 | Sommer | B60L 5/39 191/49 |
| 8,839,921 B2 | * | 9/2014 | Sommer | B60L 5/08 191/49 |

FOREIGN PATENT DOCUMENTS

| | | | | |
|---|---|---|---|---|
| FR | 2471299 A1 | * | 6/1981 | ............... B60L 5/00 |
| WO | WO-2016071065 A1 | * | 5/2016 | ............... B60L 5/39 |

* cited by examiner

*Primary Examiner* — S. Joseph Morano
*Assistant Examiner* — Cheng Lin
(74) *Attorney, Agent, or Firm* — The Small Patent Law Group LLC; Christopher R. Carroll

(57) ABSTRACT

A dual mode current collector includes a mounting frame having a pivot shaft extending along a pivot axis. A first current collector includes a housing pivotally connected to the pivot shaft, a shoe arm connected to the housing, and a shoe attached to the shoe arm. The shoe has a conductor surface configured to engage a rail. A second current collector includes a housing pivotally connected to the pivot shaft, a shoe arm connected to the housing, and a shoe attached to the shoe arm. The shoe has a conductor surface configured to engage a rail. A first actuator connected to the mounting frame and the first current collector is configured to rotate the first current collector about the pivot axis. A second actuator connected to the mounting frame and the second current collector is configured to rotate the second current collector about the pivot axis.

20 Claims, 16 Drawing Sheets

DUAL MODE COLLECTOR

CROSS-REFERENCE TO RELATED APPLICATIONS

This application is a continuation of U.S. patent application Ser. No. 16/235,548 (filed 28 Dec. 2018), the entire disclosure of which is incorporated herein by reference.

BACKGROUND

Technical Field

The present invention relates generally to a current collecting device for an electrically powered rail vehicle. In particular, the present invention relates to a dual mode collector for use with multiple types and mounting arrangement of electrified rails.

State of Art

Some forms of electrically powered rail vehicles receive power/current from an electrified rail, commonly referred to as a "third rail," generally located alongside the two wheel-riding rails of the vehicle track beside the vehicle. The rail vehicle is equipped with one or more current collecting devices which contact and receive electrical power/current from the third rail. The electrical power/current received from the third rail is used to power the motors and other electrified systems of the rail vehicle. Current collecting devices for communicating electrical current/power to a rail vehicle may be mounted in a variety of ways, such as directly to the frame of the rail vehicle or to the axle-bearing housing. An example of a known current collecting device for a rail vehicle is described in U.S. Pat. No. 3,740,498 to Herbert.

At least two arrangements and/or orientations of the third rail, as shown respectively in FIGS. 1 and 2, are commonly used in the rail vehicle industry. FIGS. 1 and 2 show sections of a vehicle track system I having wheel rails 2 on which the wheels of an electric rail vehicle ride. The third rail 3 is situated alongside and generally parallel with the wheel rails 2. In FIGS. 1 and 2, the third rail 3 is shown positioned outside the wheel rails 2, although in some systems the third rail 3 may be positioned between the wheel rails 2. The third rail 3 is a conductor which is supplied electricity by a power source (not shown). A contact surface 4 is exposed such that a conductive device, such as a current collecting device for a rail vehicle (not shown), may contact the contact surface 4 to receive electrical current/power from the third rail 3. For a variety of reasons, the third rail 3 may be oriented such that the contact surface 4 faces upward, as shown in FIG. 1, or downward, as shown in FIG. 2.

A shortcoming of known collecting devices, such as that taught by Herbert, is that such devices are configured only for one specific orientation of the third rail. Thus, the collecting device must be installed on the rail vehicle with foreknowledge of the orientation of the third rail of the track system on which the rail vehicle will be used. If the rail vehicle is later used on a track system having a different orientation of the third rail, the collecting devices must be either remounted on the rail vehicle in a different orientation or replaced with a different collecting device.

One known collecting device which endeavors to overcome the aforementioned deficiencies is described in U.S. Pat. No. 8,348,035 to Sommer. However, there continues to exist a need for collecting devices which are suitable for use with multiple third-rail orientations of rail vehicle track systems.

BRIEF SUMMARY

Non-limiting embodiments of the present invention are directed to a dual mode current collector including a mounting frame for attachment to a rail vehicle, the mounting frame including a plurality of legs and a pivot shaft extending between the plurality of legs along a pivot axis. A first current collector includes a first housing pivotally connected to the pivot shaft of the mounting frame, a first shoe arm connected to the first housing, and a first shoe attached to the first shoe arm. The first shoe has at least one conductor surface configured to engage a top side of an over-running rail. A second current collector includes a second housing pivotally connected to the pivot shaft of the mounting frame, a second shoe arm connected to the second housing, and a second shoe attached to the second shoe arm. The second shoe has at least one conductor surface configured to engage an underside of an under-running rail. A first actuator connected to the mounting frame and to the first current collector is configured to rotate the first current collector about the pivot axis. A second actuator connected to the mounting frame and to the second current collector is configured to rotate the second current collector about the pivot axis.

In some non-limiting embodiments, the first current collector is configured to rotate about the pivot axis independently of the second current collector.

In some non-limiting embodiments, each of the first shoe and the second shoe has an upper conductor surface and a lower conductor surface.

In some non-limiting embodiments, at least one of the first actuator and the second actuator includes a pneumatic cylinder.

In some non-limiting embodiments, the pneumatic cylinder includes a rod lock configured to engage a rod of the pneumatic cylinder to prevent extension and retraction of the rod.

In some non-limiting embodiments, the pneumatic cylinder is mounted to the mounting frame and to the first housing such that extension of the pneumatic cylinder raises the first current collector away from the over-running rail and retraction of the pneumatic cylinder lowers the first current collector toward the over-running rail.

In some non-limiting embodiments, the pneumatic cylinder is mounted to the mounting frame and to the second housing such that extension of the pneumatic cylinder raises the second current collector towards the under-running rail and retraction of the pneumatic cylinder lowers the second current collector away from the under-running rail.

In some non-limiting embodiments, the first current collector further includes a torsion element connecting the first shoe arm to the first housing, the torsion element permitting radial deflection of the first shoe arm relative to the first housing.

In some non-limiting embodiments, the torsion element has a polygonal outer surface, and the torsion element is disposed in a polygonal bore of the shoe arm.

In some non-limiting embodiments, the torsion element is connected to the first housing via an arm pivot shaft rotationally fixable relative to the first housing.

In some non-limiting embodiments, the arm pivot shaft is vertically adjustable within a slot defined in the first housing.

In some non-limiting embodiments, the rod lock is implemented in a pneumatic circuit. The pneumatic circuit includes an air source and a rod lock dump valve. The rod lock dump valve has a first inlet port in fluid communication with the air source, an outlet port in fluid communication with the rod lock, an exhaust port in fluid communication with atmospheric pressure, and a solenoid configured to switch the rod lock dump valve between a first state in which the first inlet port is in fluid communication with the outlet port and a second state in which the outlet port is in fluid communication with the exhaust port. The pneumatic circuit further includes a pressure switch configured to detect air pressure received at the first inlet port and, based on the pressure detected, actuate the solenoid to switch the rod lock dump valve between the first state and the second state. With the rod lock dump valve in the second state, the rod lock is configured to engage the rod of the pneumatic cylinder.

In some non-limiting embodiments, the pneumatic circuit further includes a rod lock override control valve having a first inlet port in fluid communication with the air source, a second inlet port in fluid communication with a reservoir, an outlet port in fluid communication with the first inlet port of the rod lock dump valve, and a solenoid configured to switch the rod lock override control valve between a first state in which the first inlet port is in fluid communication with the outlet port and a second state in which the second inlet port is in fluid communication with the outlet port.

In some non-limiting embodiments, the rod lock is implemented in a pneumatic circuit. The pneumatic circuit includes an air source and a shuttle valve having an inlet port in fluid communication with the air source, an outlet port in fluid communication with the rod lock, an exhaust port in fluid communication with atmospheric pressure, and a sliding element moveable between a first position and a second position based on air pressure received at the inlet port. In the first position of the sliding element, the inlet port is in fluid communication with the outlet port and the exhaust port is isolated. In the second position of the sliding element, the outlet port is in fluid communication with the exhaust port and the inlet port is isolated. With the sliding element in the second position, the rod lock is configured to engage the rod of the pneumatic cylinder.

In some non-limiting embodiments, the pneumatic circuit further includes a rod lock override control valve having a first inlet port in fluid communication with the air source, a second inlet port in fluid communication with a reservoir, an outlet port in fluid communication with the inlet port of the shuttle valve, and a solenoid configured to switch the rod lock override control valve between a first state in which the first inlet port is in fluid communication with the outlet port and a second state in which the second inlet port is in fluid communication with the outlet port.

Other non-limiting embodiments of the present invention are directed to a dual mode current collector including a mounting frame for attachment to a rail vehicle and a plurality of current collectors. Each current collector includes a housing pivotally connected to the mounting frame, a shoe arm connected to the first housing, and a shoe attached to the first shoe arm, the first shoe having at least one conductor surface configured to engage a rail. The dual mode current collector further includes a plurality of pneumatic cylinders, each of the plurality of pneumatic cylinders connected to the mounting frame and to one of the plurality of current collectors. Each of the plurality of pneumatic cylinders is configured to rotate the current collector to which it is connected relative to the mounting frame. The shoe of at least one of the plurality of current collectors is configured to engage a top side of an over-running rail, and the shoe of at least one of the plurality of current collectors is configured to engage an underside of an under-running rail.

In some non-limiting embodiments, each of the plurality of current collectors is configured to rotate relative to the mounting frame independently of the others of the plurality of current collectors.

In some non-limiting embodiments, a first of the plurality of current collectors is configured to engage the top side of the over-running rail via retraction of a first of the plurality of pneumatic cylinders connected to the first of the plurality of current collectors.

In some non-limiting embodiments, a second of the plurality of current collectors is configured to engage the underside of the under-running rail via extension of a second of the plurality of pneumatic cylinders connected to the second of the plurality of current collectors.

In some non-limiting embodiments, the second of the plurality of pneumatic cylinders includes a rod lock configured to prevent extension and retraction of a rod of the second of the plurality of pneumatic cylinders.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a," "an," and "the" include plural referents unless the context clearly dictates otherwise.

DETAILED DESCRIPTION OF THE INVENTION

Figure 1:
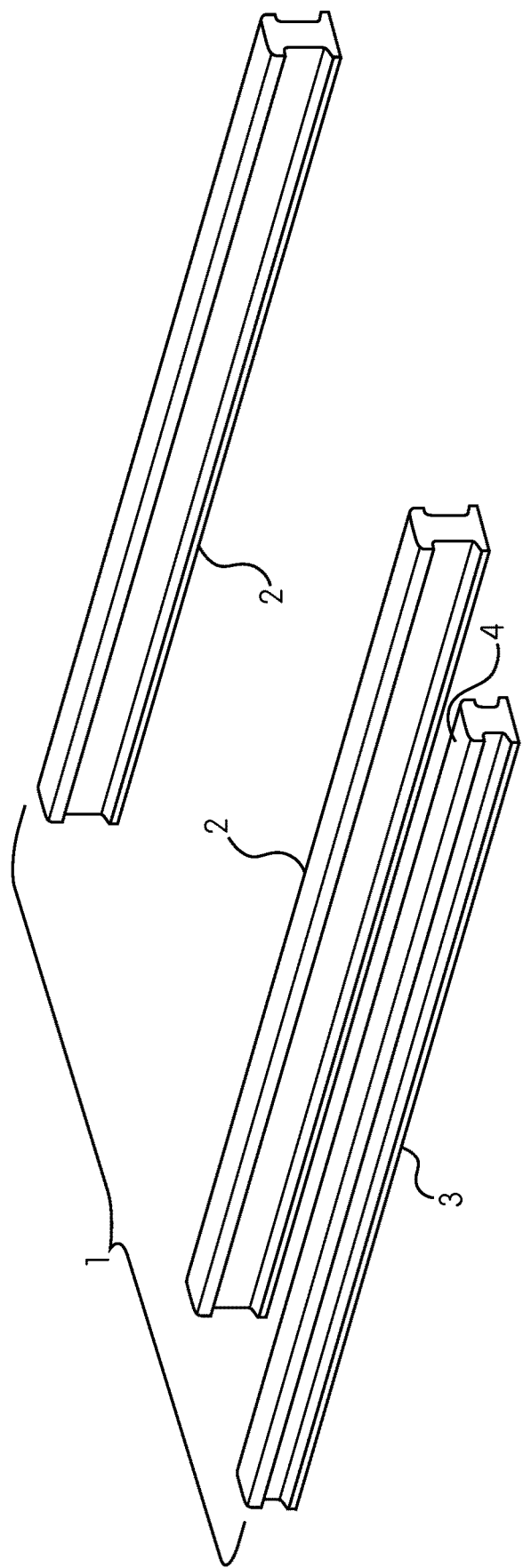
FIG. 1 is a perspective view of a section of a known rail vehicle track system arrangement.
Figure 2:
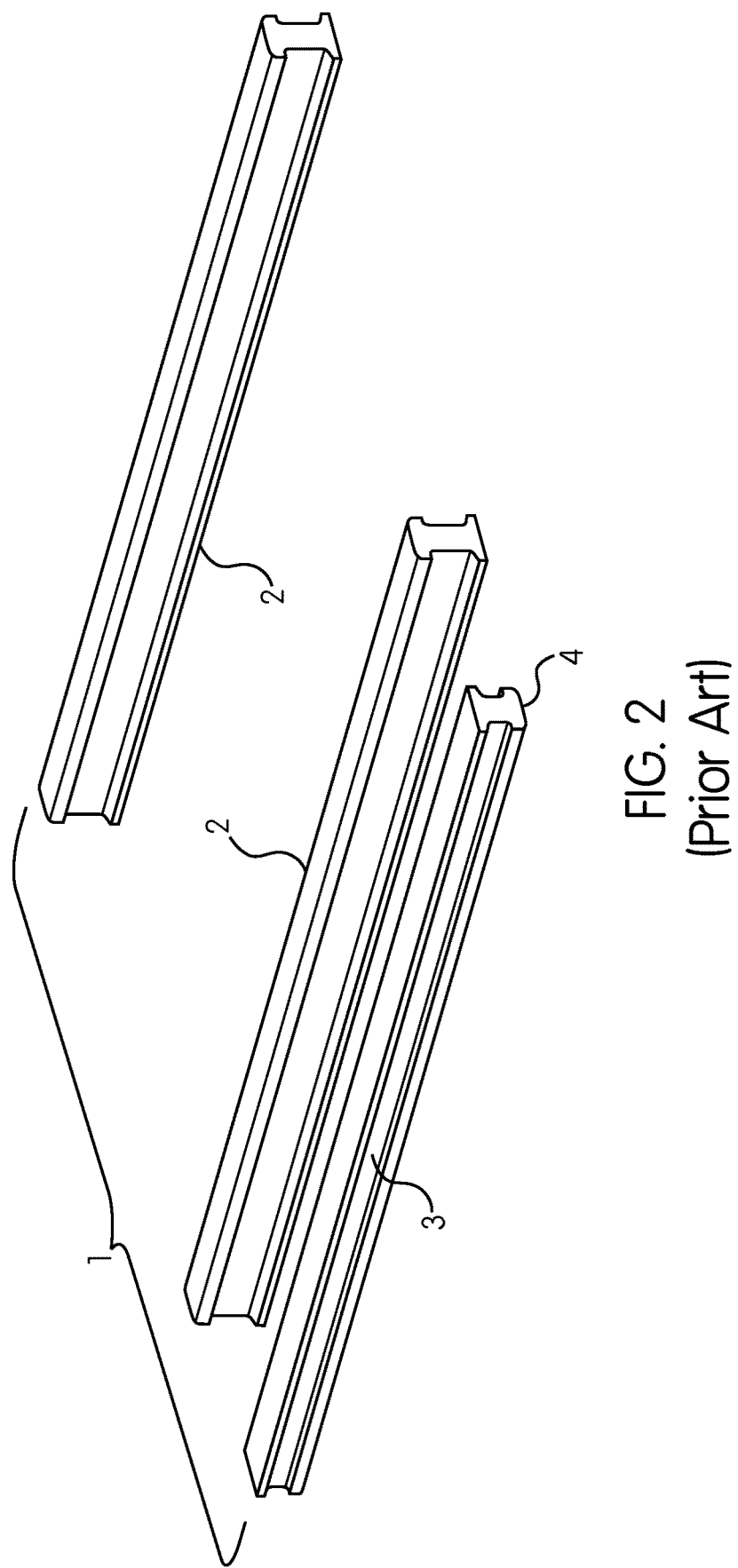
FIG. 2 is a perspective view of a section of another known rail vehicle track system arrangement.
Figure 3:
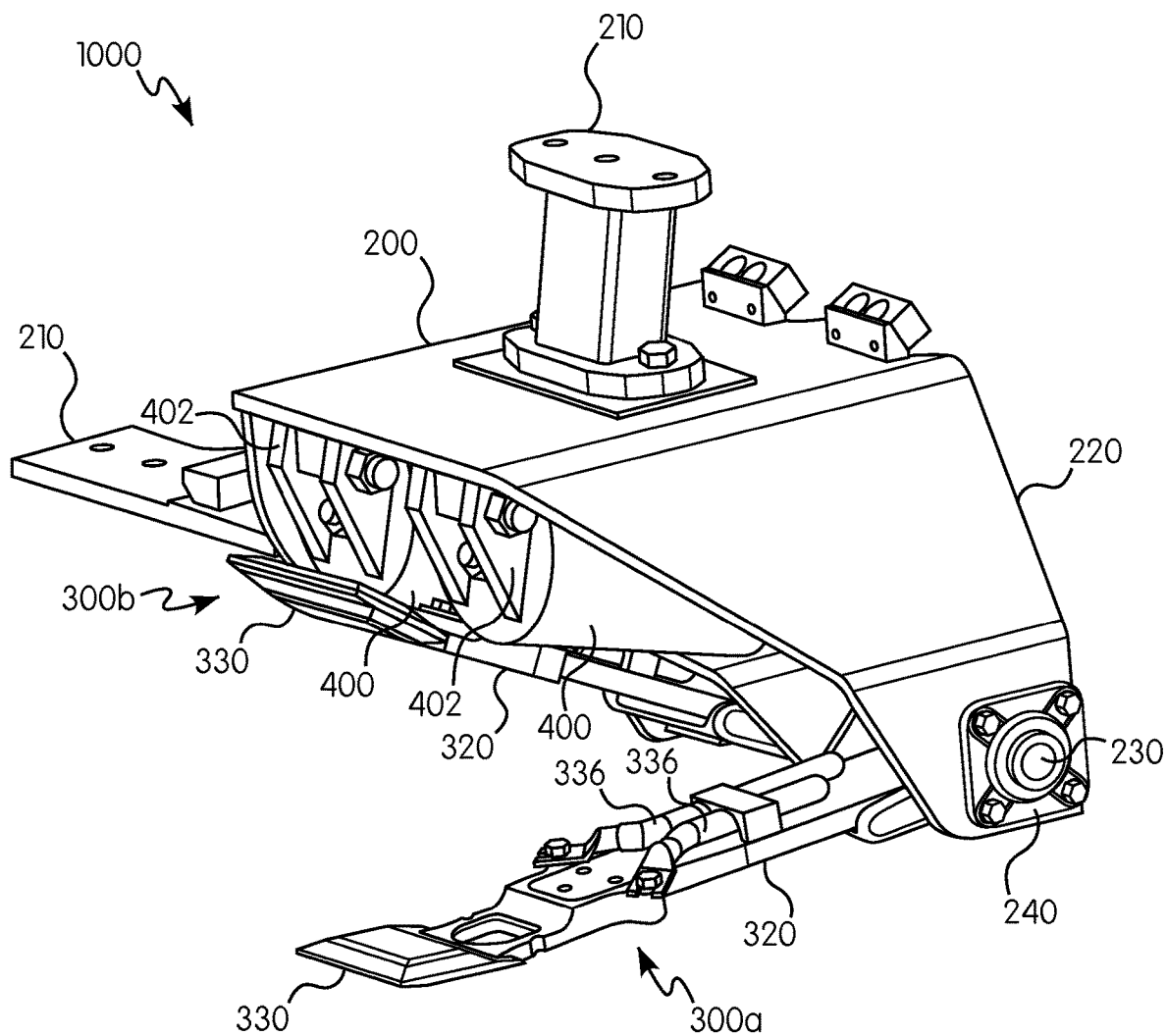
FIG. 3 is a perspective view of a non-limiting embodiment of a current collecting device of the present invention.
Figure 4:
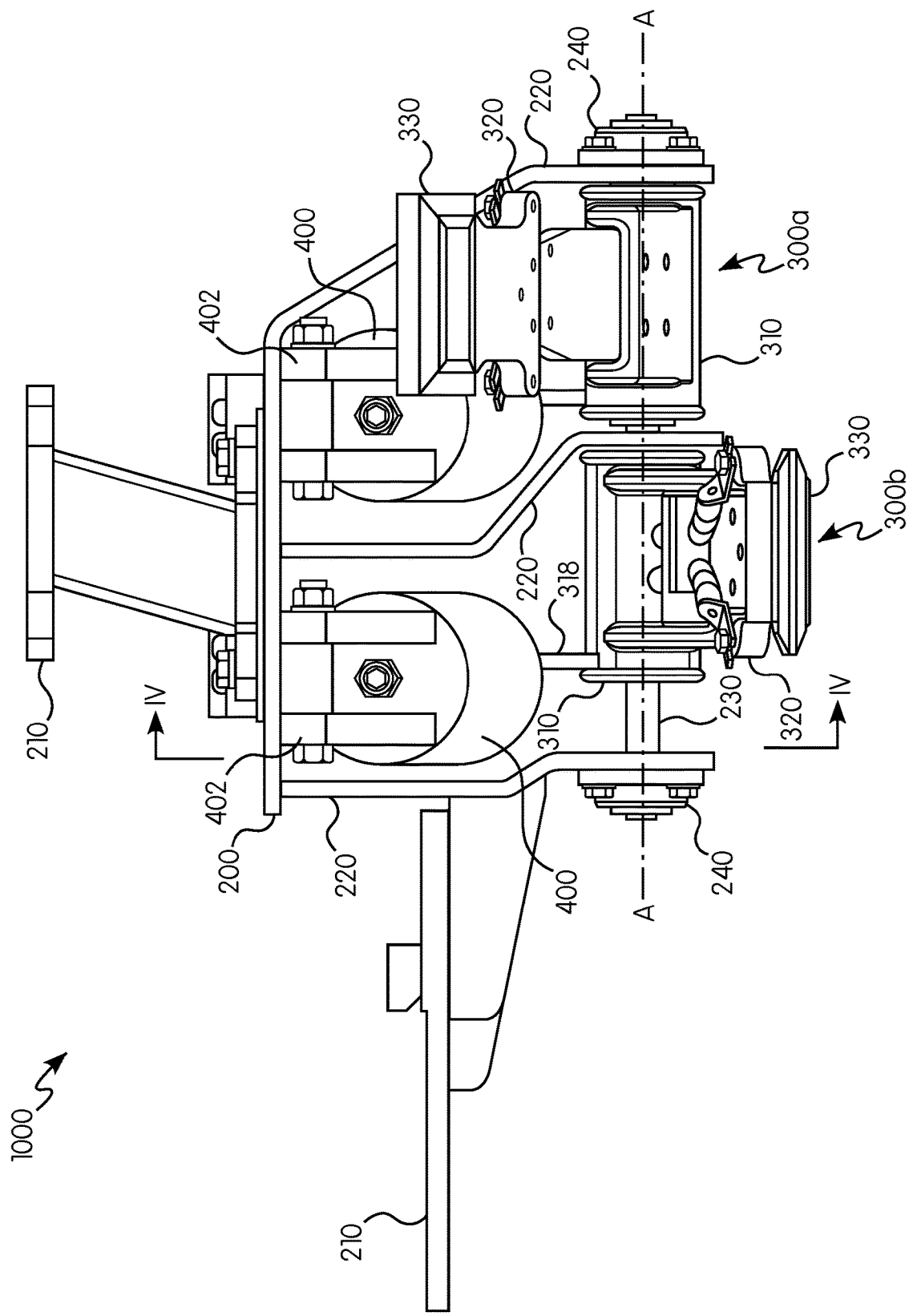
FIG. 4 is a front view of the current collecting device of FIG. 3.
Figure 5:
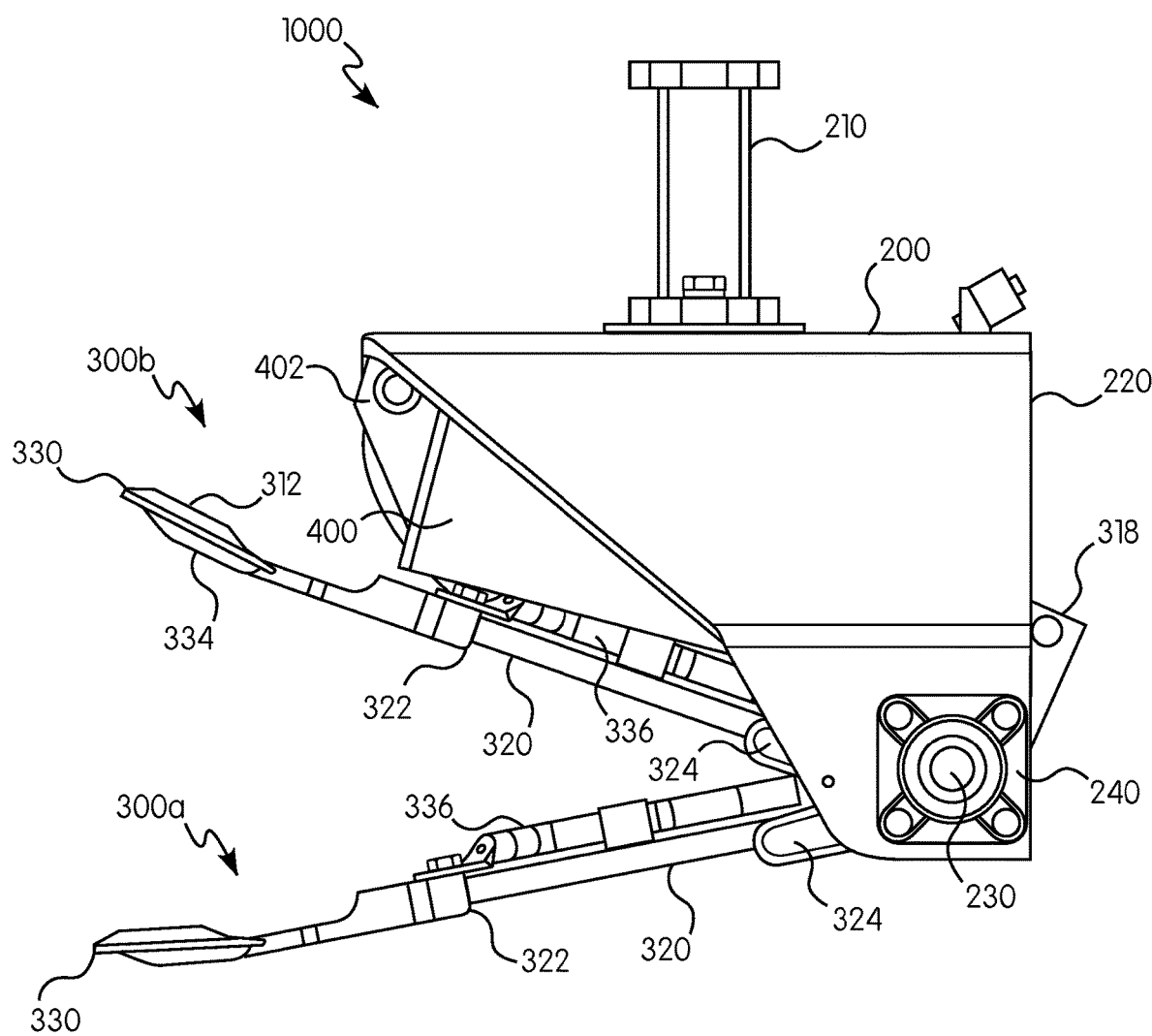
FIG. 5 is a right side view of the current collecting device of FIG. 3.
Figure 6:
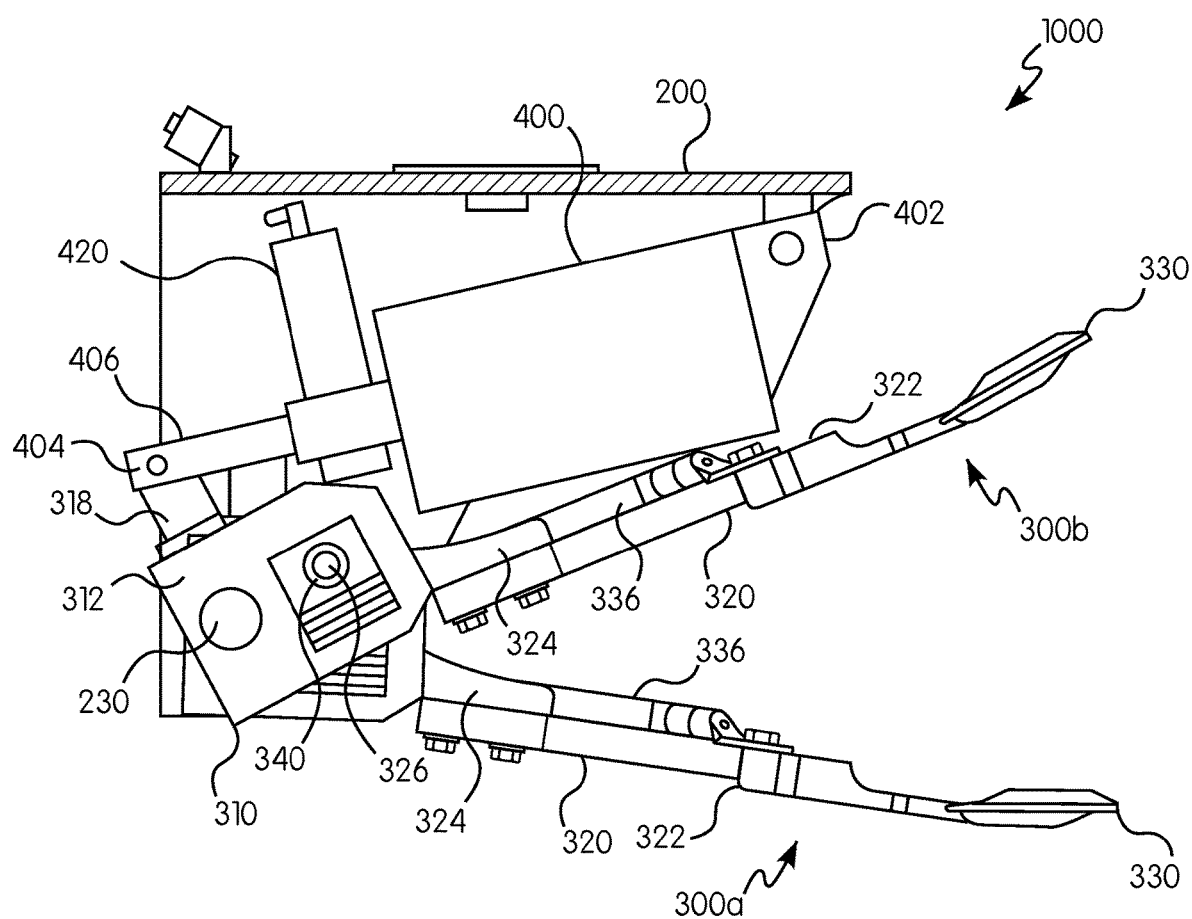
FIG. 6 is a left side section view of the current collecting device of FIG. 3, as viewed from section arrows IV-IV indicated on FIG. 4.
Figure 7:
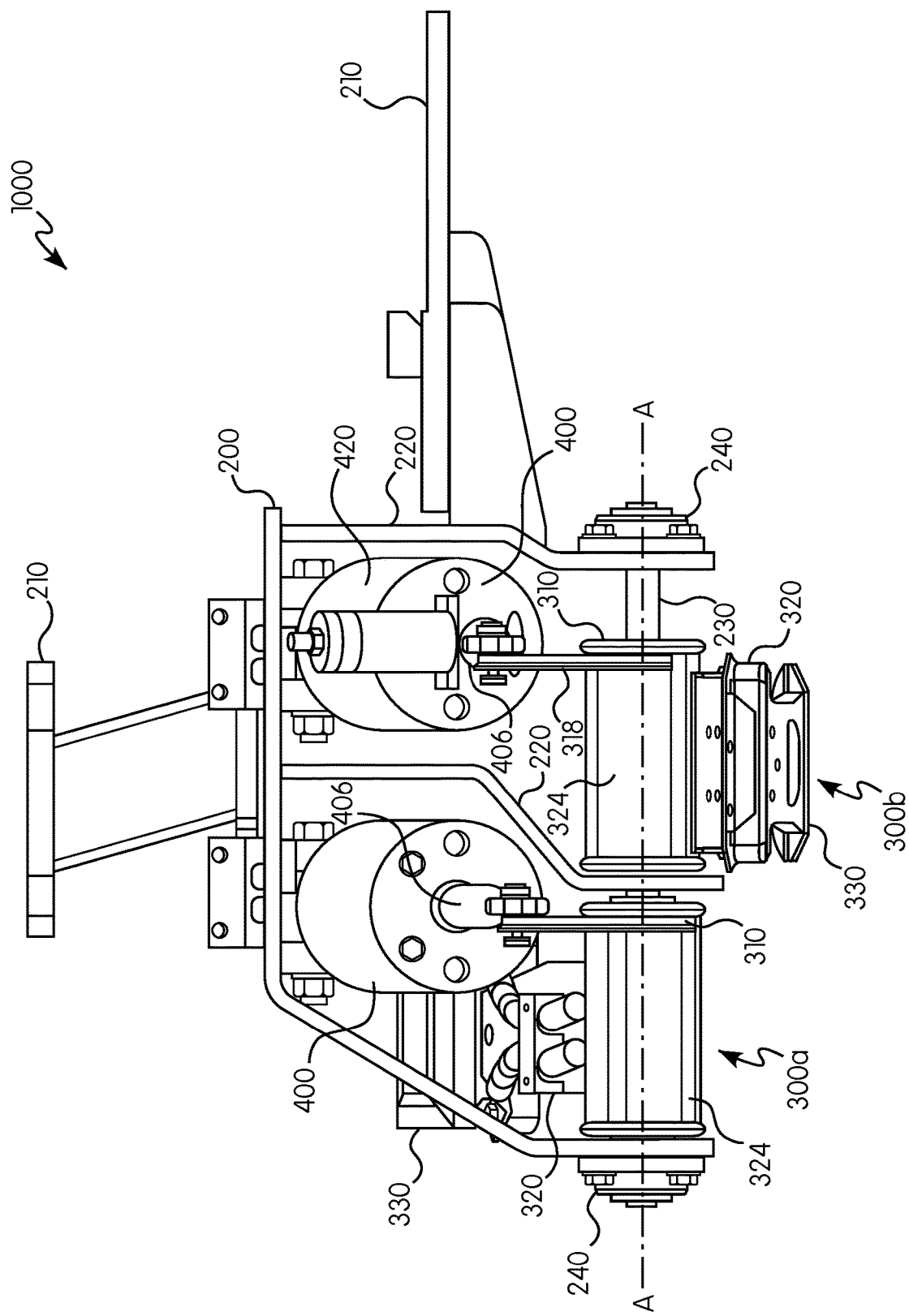
FIG. 7 is a rear view of the current collecting device of FIG. 3.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

As used herein, the term "at least one of" is synonymous with "one or more of." For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more or all of D, E, and F.

As used herein, the term "third rail" refers to a stationary, electrified structure of a rail vehicle track system from which a rail vehicle may receive electrical current/power. A third rail is a continuous or semi-continuous conductor which generally runs alongside the wheel-supporting rails of an electric rail vehicle track system.

The present invention generally relates to a current collecting device for an electrically powered rail vehicle. In particular, the present invention relates to a dual mode collector for use with multiple types and mounting arrangements of the third rail. With reference to FIGS. 3-7, a non-limiting embodiment of a current collecting device 1000 for a rail vehicle in accordance with the principles of the present invention generally includes a mounting frame 200 and a plurality of collectors 300, namely, a first collector 300a and a second collector 300b. The mounting frame 200 may include one or more attachment brackets 210 and/or other suitable structures for rigidly affixing the current collecting device 1000 to a rail vehicle (not shown). The mounting frame 200 may further include one or more legs 220 which define a pivot axis A, along which the plurality of collectors 300 may be rotatably mounted. A collector pivot shaft 230 may extend through the one or more legs 220 along the pivot axis A.

Each of the collectors 300a, 300b may be connected to the mounting frame 200 via the collector pivot shaft 230 such that the collectors 300a, 300b are independently rotatable relative to the mounting frame 200 and relative to one another. In a non-limiting embodiment, the collector pivot shaft 230 may be connected to the mounting frame 200 via one or more pivot shaft bearings 240 which permit rotation of the collector pivot shaft 230 relative to the mounting frame 200. Each of the pivot shaft bearings 240 may include a roller bearing, a ball bearing, a bushing, or a like component for facilitating rotation of the collector pivot shaft 230 relative to the legs 220 of the mounting frame 200. In other non-limiting embodiments, the pivot shaft bearings 240 may be omitted and the collector pivot shaft 230 may be rigidly connected to the legs 220 of the mounting frame 200. Each of the collectors 300a, 300b is independently rotatable relative to the collector pivot shaft 230 such the collectors may be assume different positions relative to one another as will be described herein.

The current collecting device 1000 may further include one or more actuators, such as pneumatic cylinders 400, respectively mounted to each of the collectors 300a, 300b, and to the mounting frame 200. A first end 402 of each pneumatic cylinder 400 may be connected to the mounting frame 200, and a second end 404 of each pneumatic cylinder 400 may be connected to one of the collectors 300. Each of the pneumatic cylinders 400 may be actuated to rotate the collector 300a, 300b to which the pneumatic cylinder 400 is attached relative to the mounting frame 200 about the pivot axis A.

Referring now to FIGS. 8-11, a collector 300, which may be either the first collector 300a or the second collector 300b, will now be described in greater detail. Each collector 300 includes a housing 310 rotatably connectable to the collector pivot shaft 230 of the mounting frame 200. In some non-limiting embodiments, the housing 310 may include two plate members 312, each having an aperture therein through which the collector pivot shaft 230 extends. The housing 310 of each collector 300 further includes a cylinder tab 318 to which the second end 404 of the pneumatic cylinder 400 may be attached. Each collector 300 further includes a shoe arm 320 having a first end 322 and a second end 324. A contact shoe 330 configured to engage the third rail 910, 920 (see FIGS. 12 and 13) may be mounted to the first end 322 of the shoe arm 320. The contact shoe 330 may have an upper conductor surface 332 and a lower conductor surface 334 each configured to engage and slide along the third rail 910, 920. The contact shoe 330 is typically a wear component requiring periodic replacement, and as such, the contact shoe 330 may be removably mounted to the first end 322 of the shoe arm 320. The contact shoe 330 is connected to one or more conductor cables 336. Electrical current/power is transmitted from the third rail 910, 920, through the contact shoe 330 and the one or more conductor cables 336, and to the motors and other electrical systems of the rail vehicle.

The second end 324 of the shoe arm 320 may be mounted to the housing 310 by an arm pivot shaft 326 extending through a slot 314 in each of the plate members 312. The slot 314 of each plate member 312 has a major axis having a length greater than the diameter of the arm pivot shaft 326 to allow vertical adjustment of the arm pivot shaft 326 relative to the housing 310. A plurality of teeth 316, each extending in a direction generally perpendicular to the major axis of the slot 314, surrounds the slot 314 in each of the plate members 312. A shaft collar 340 may be mounted to each end of the arm pivot shaft 326 to set the vertical position of the arm pivot shaft 326 within the slots 314 and to rotationally fix the arm pivot shaft 326 relative to the housing 310. Each shaft collar 340 may have one or more teeth 342 having a complementary profile to the teeth 316 of the plate members 312. To set the location of the arm pivot shaft 326 within the slots 314, the shaft collars 340 are slid onto the respective ends of the arm pivot shaft 326 such that the teeth 342 of the shaft collars 340 engage at a desired position with the plurality of teeth 316 of the plate member 312. Engagement of the plurality of teeth 316 of the plate members 312 with the one or more teeth 342 of the shaft collars 340 prevents vertical movement of shaft collars 340 and, consequently, vertical movement of the arm pivot shaft 326 within the slots 314.

To rotationally fix the arm pivot shaft 326 relative to the housing 310, one or both of the shaft collars 340 may include a clamp which rotationally locks the shaft collar 340 to the arm pivot shaft 326. In the non-limiting embodiment shown in FIGS. 8-11, the clamp may include a split ring 344 and an adjustable screw 346. The adjustable screw 346 may be tightened to squeeze the arm pivot shaft 326 within the split ring 344, frictionally locking the arm pivot shaft 326 to the shaft collar 340. Prior to tightening the adjustable screw 346, the arm pivot shaft 326 may be rotated to locate the shoe arm 320 at a desired position relative to the housing 310. The adjustable screw 346 may then be tightened to lock the arm pivot shaft 326 in place relative to the housing 310.

Figure 8:
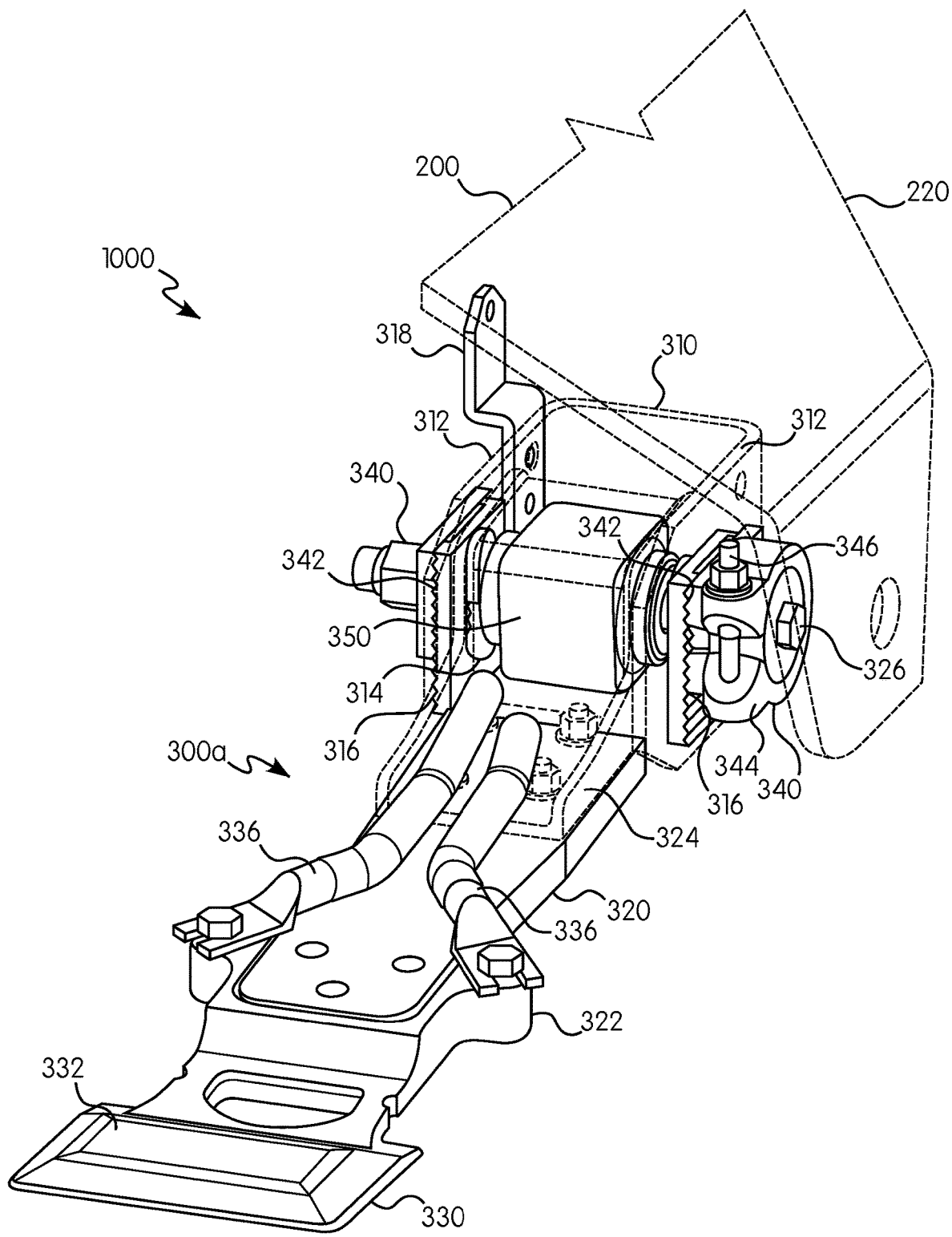
FIG. 8 is perspective view of a first collector of the current collecting device of FIG. 3.
Figure 9:
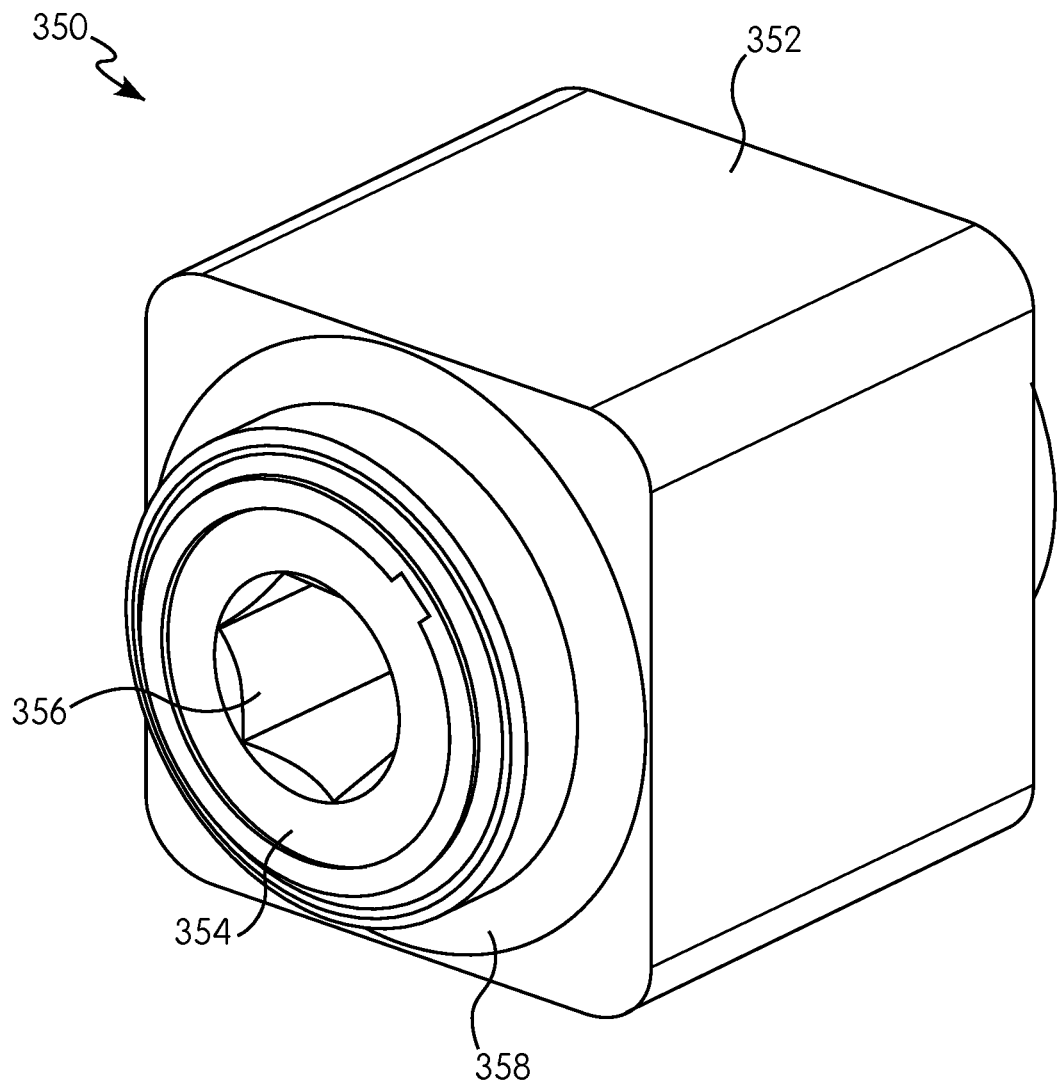
FIG. 9 is a perspective view of a center-bonded bushing of the first collector of FIG. 8.

In some non-limiting embodiments, the second end 324 of the shoe arm 320 may be elastically mounted to the housing 310 and the arm pivot shaft 326 via a torsion element, such as a center-bonded bushing 350 as shown in FIG. 9. An outer housing 352 of the center-bonded bushing 350 may have a polygonal or substantially polygonal cross section, such as a square cross section with filleted corners as shown in the non-limiting embodiment of FIG. 9. Referring back to FIG. 8, the second end 324 of the shoe arm 320 is shown transparently so that the connection between the center-bonded bushing 350 and shoe arm 320 may be appreciated. The center-bonded bushing 350 includes an internal sleeve 354 having a polygonal or substantially polygonal bore 356, such as a hexagonal bore shown in the non-limiting embodiment of FIG. 9. The internal sleeve 354 is joined to the outer housing 352 by an elastomer block 358 configured to allow controlled rotational deflection of the internal sleeve 354 relative to the outer housing 352 under a torsional load. More particularly, rotating the internal sleeve 354 relative to the outer housing 352 generates a progressively higher spring force within the elastomer block 358, which biases the center-bonded bushing 350 back to a relaxed state once the torsional load is removed.

Figure 10:
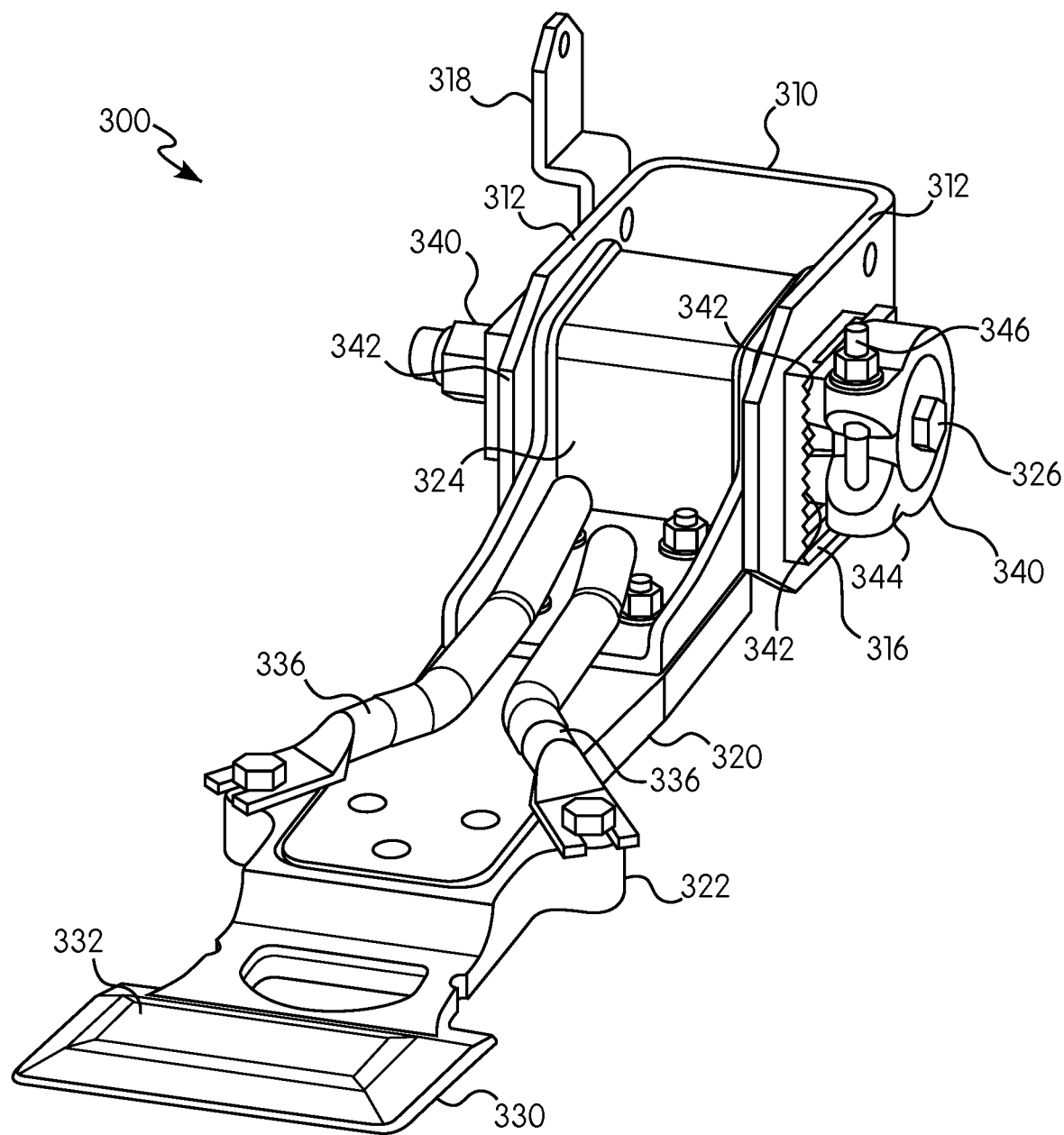
FIG. 10 is a perspective view of the first collector of FIG. 8.
Figure 11:
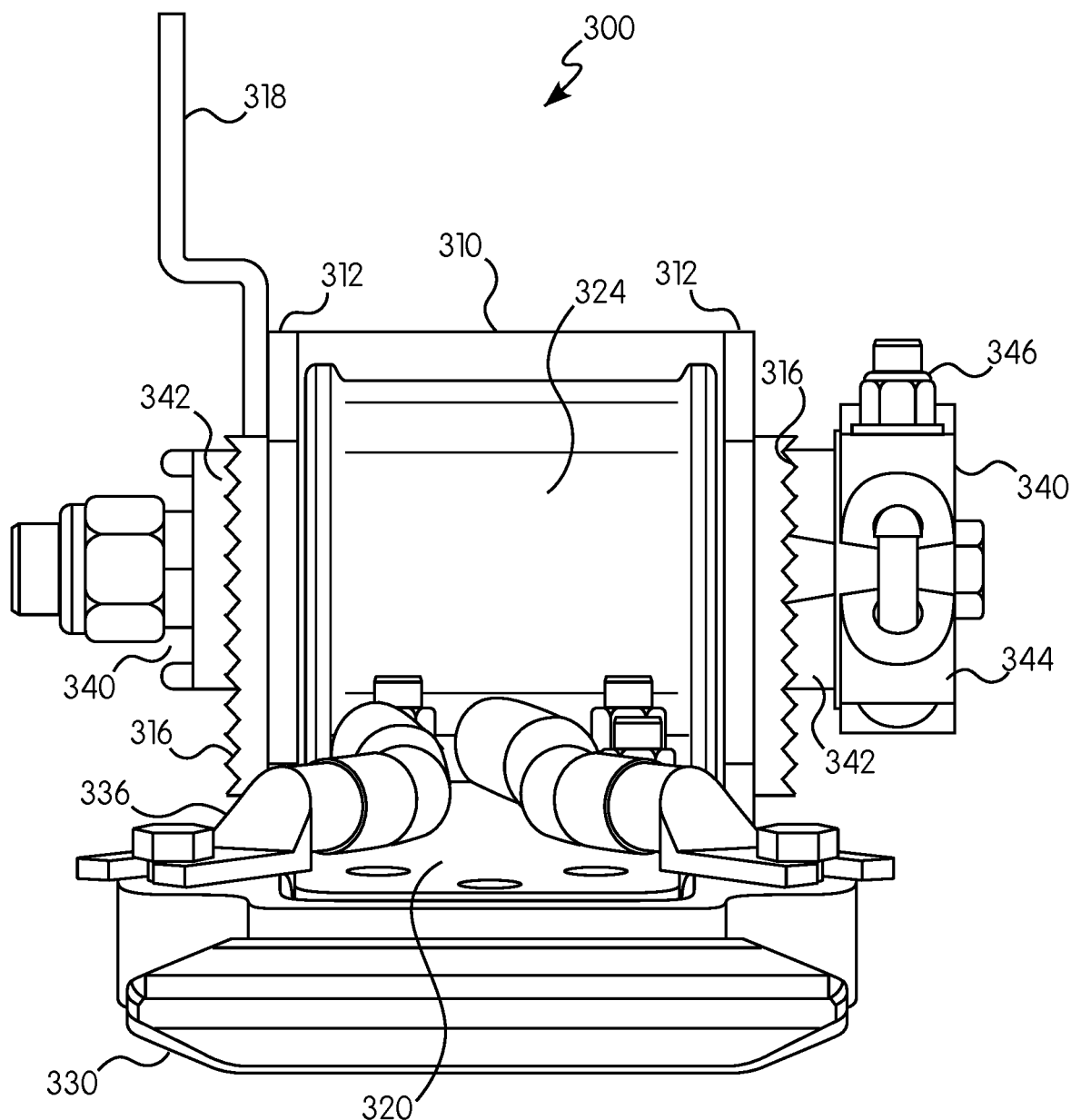
FIG. 11 is a front view of the first collector of FIG. 10.

The second end 324 of the shoe arm 320 may have a polygonal bore 328 shaped to receive the outer housing 352 of the center-bonded bushing 350. The polygonal shapes of the outer housing 352 and the bore 328 of the shoe arm 320 prevent rotation of the outer housing 352 relative to the shoe arm 320. Similarly, the arm pivot shaft 326 may have a polygonal cross section, such as a hexagonal cross section as shown in FIGS. 8, 10, and 11, corresponding to the polygonal bore 356 of the internal sleeve 354 of the center-bonded bushing 350. The polygonal shapes of the arm pivot shaft 326 and the bore 356 of the internal sleeve 354 prevent rotation of the arm pivot shaft 326 relative to the internal sleeve 354. In other non-limiting embodiments, the arm pivot shaft 326 may be rotationally fixed to the internal sleeve 354 of the center-bonded bushing 350 in other manners known in the art. For example, the arm pivot shaft 326 and the internal sleeve 354 may have corresponding keyways for receiving a key which prevents rotation of the arm pivot shaft 326 relative to the internal sleeve 354.

With the center-bonded bushing 350 connected to the shoe arm 320 and the arm pivot shaft 326, rotation of the shoe arm 320 relative to the housing 310 is limited to the controlled rotation permitted by the elastomer block 358 of the center-bonded bushing 350 when a load is applied to the shoe arm 320. To adjust the unloaded position of the shoe arm 320 relative to the housing 310, the adjustable screw 346 of the shaft collar 340 may be loosened, the arm pivot shaft 326 may be rotated to the desired position, and the adjustable screw 346 may be retightened, locking the arm pivot shaft 326 in the split ring 344.

Figure 12:
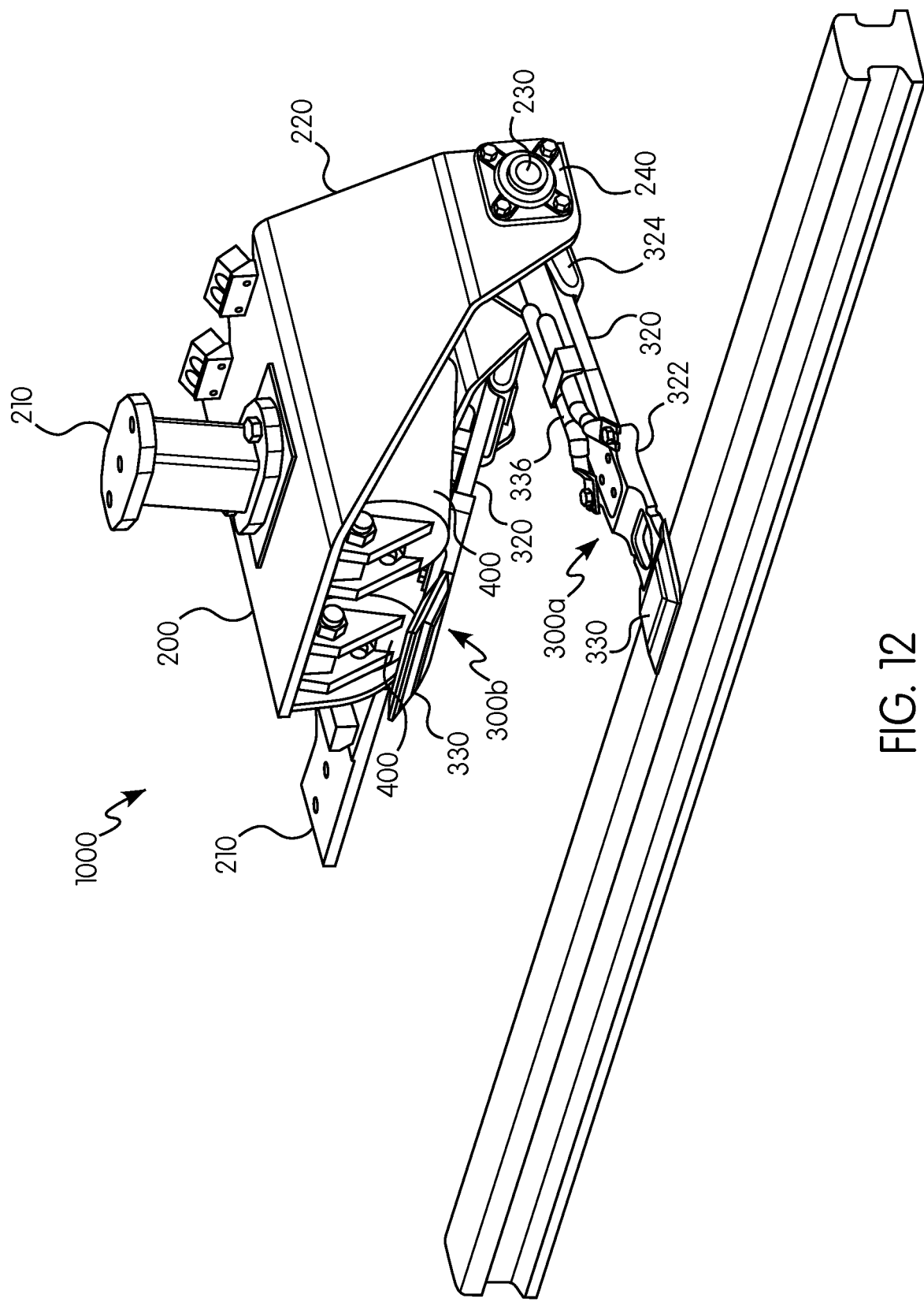
FIG. 12 is a perspective view of the current collecting device of FIG. 3, with the first collector engaged with a third rail in an over-running configuration.
Figure 13:
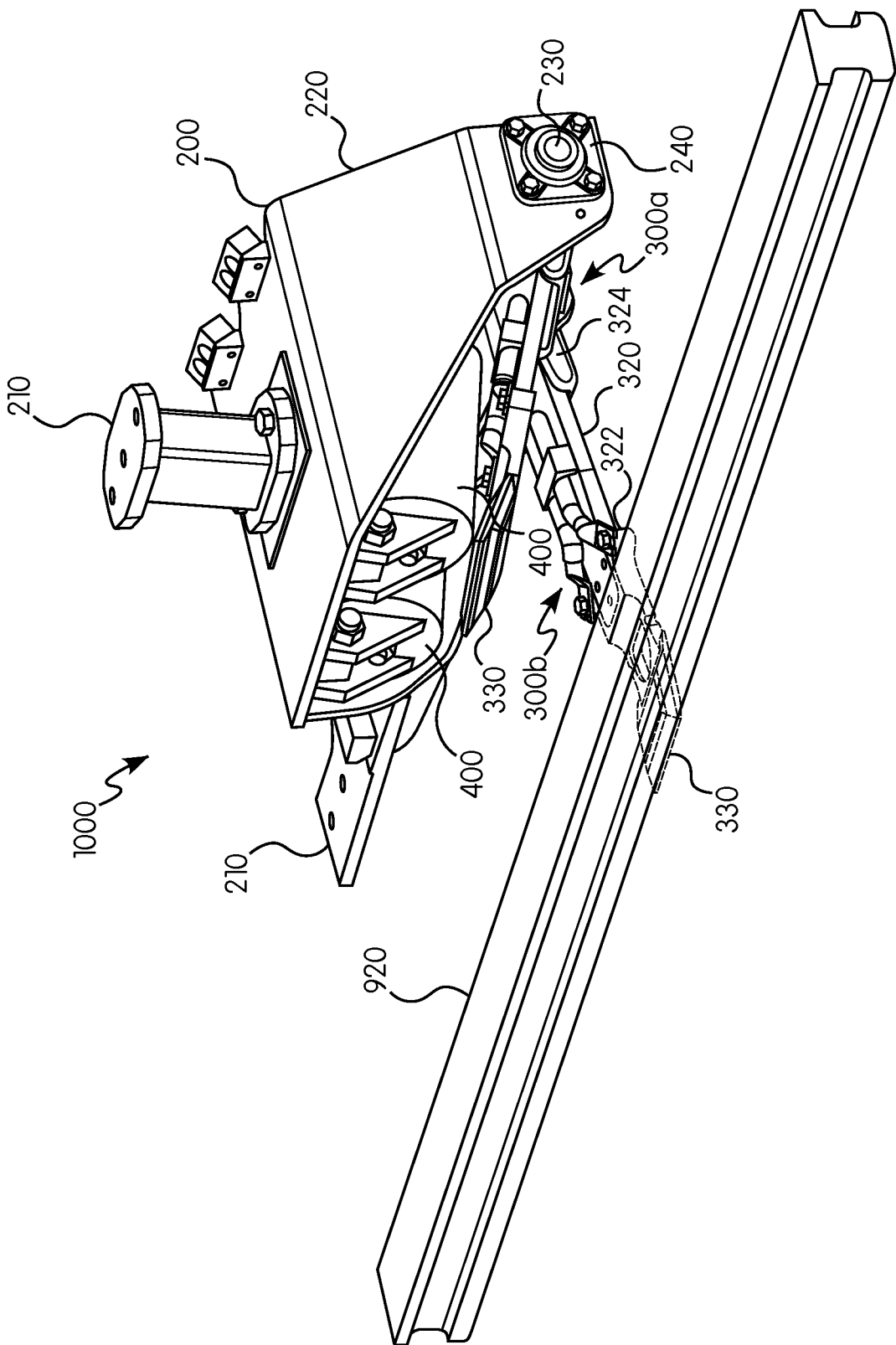
FIG. 13 is a perspective view of the current collecting device of FIG. 3, with a second collector engaged with a third rail in an under-running configuration.

Referring no to FIGS. 12-13, the current collecting device 1000 may be configured to selectively drive one of the first collector 300a and the second collector 300b into engagement with the third rail 910, 920, depending on the orientation of the third rail 910, 920. In the non-limiting embodiment shown in the drawings, the first collector 300a is configured to engage an over-running third rail 910, and the second collector 300b is configured to engage an under-running third rail 920. FIG. 12 shows a non-limiting embodiment of the current collecting device 1000 in use on a rail track system having an over-running third rail 912. To properly engage the over-running third rail 910, the pneumatic cylinder 400 connected to the first collector 300a may be actuated in a first direction to rotate the first collector 300a about the pivot axis A such that the lower conductor surface 334 of the contact shoe 330 of the first collector 300a engages a contact surface 922 of the over-running first third rail 910. The pneumatic cylinder 400 connected to the second collector 300b may be actuated in a second direction to rotate the second collector 300b about the pivot axis A such that the contact shoe 330 of the second collector 300b is out of contact with the over-running third rail 910.

FIG. 13 shows a non-limiting embodiment of the current collecting device 1000 in use on a rail track system having an under-running third rail 920. To properly engage the under-running third rail 920, the pneumatic cylinder 400 connected to the first collector 300a may be actuated in a third direction, opposite the first direction, to rotate the first collector 300a about the pivot axis A such that the contact shoe 330 of the first collector 300a is out of contact with the under-running third rail 920. The pneumatic cylinder 400 connected to the second collector 300b may be actuated in a fourth direction, opposite the second direction, to rotate the second collector 300b about the pivot axis A such that the upper conductor surface of the contact shoe 330 of the second collector 300b engages a contact surface 922 of the under-running third rail 920. In the above described manner, the current collector device 1000 may be used to change which of the one or more collectors 300a, 300b is in contact with the third rail 910, 920 depending on the orientation (i.e., over-running or under-running) of the third rail 910, 920.

In real world track systems, the distance between the third rails 910, 920 and the mounting frame 200, which is rigidly attached to the railcar, is unlikely to be constant over any substantial length of track. Intolerances during manufacturing and assembly of the various components of the track system, uneven wear of components, and discontinuities in the third rail 910, 912 can all cause variance in the distance between the third rail 910, 912 and the mounting frame 200 over a given length of the third rail 910, 920. To ensure that contact is maintained between the collectors 300a, 300b and the third rail 910, 920 in spite of such variance, the collectors 300a, 300b may be calibrated to suit the height of the third rail 910, 920 by adjusting the position of the arm pivot shaft 326 within the slots 314 and by adjusting the rotation of the arm pivot shaft 326 relative to the shaft collars 340. These adjustment processes are described above with reference to FIGS. 8-11. The collectors 300a, 300b may be particularly calibrated such that the center-bonded bushing 350 is in a preloaded state when the contact shoe 330 engages the third rails 910, 920. In the preloaded state, the internal sleeve 354 of the center-bonded bushing 350 is rotated relative to the outer housing 352 such that a spring force is stored in the elastomer block 358. The center-bonded bushing 350 is maintained in the preloaded state until the contact shoe 330 separates from the third rail 910, 920, at which point the shoe arm 320 is permitted to radially deflect as the spring force stored in the elastomer block 358 is released.

Referring back to FIG. 12, the first collector 300a is shown engaged with the over-running third rail 910 with the center-bonded bushing 350 in the preloaded state. If the distance between the third rail 910 and the mounting frame 200 increases, the shoe arm 320 radially deflects in a downward direction along with the third rail 910 as the center-bonded bushing 350 is released from the preloaded state. Thus, the contact shoe 330 remains in contact with the third rail 910 despite the change in distance between the third rail 910 and the mounting frame 200. Conversely, if the distance between the third rail 910 and the mounting frame 200 decreases, the center-bonded bushing 350 permits the shoe arm 320 to deflect in an upward direction along with the third rail 910. Thus, the contact shoe 330 remains in contact with the third rail 910 despite the change in distance between the third rail 910 and the mounting frame 200.

Similarly, referring again to FIG. 13, the second collector 300b is shown engaged with the under-running third rail 920 with the center-bonded bushing 350 in the preloaded state. If the distance between the third rail 920 and the mounting frame 200 decreases, the shoe arm 320 radially deflects in an upward direction along with the third rail 920 as the center-bonded bushing 350 is released from the preloaded state. Thus, the contact shoe 330 remains in contact with the third rail 920 despite the change in distance between the third rail 920 and the mounting frame 200. Conversely, if the distance between the third rail 920 and the mounting frame 200 increases, the center-bonded bushing 350 permits the shoe arm 320 to deflect in a downward direction along with the third rail 920. Thus, the contact shoe 330 remains in contact with the third rail 920 despite the change in distance between the third rail 920 and the mounting frame 200. As may be appreciated from FIG. 12, the pneumatic cylinder 400 connected to the first collector 300a is retracted to drive the first collector 300a into engagement with the over-running third rail 910. Conversely, the pneumatic cylinder 400 connected to the second collector 300b is extended to drive the second collector 300b into engagement with the under-running third rail 920. Referring back to FIG. 7, in some non-limiting embodiments, the pneumatic cylinder 400 connected to the second collector 300b may be equipped with a rod lock 420, of any design known in the art, capable of holding the rod 406 of the cylinder in the extended position in the event that the air source to the pneumatic cylinder 400 fails. A rod lock 420 is particularly desirable on the pneumatic cylinder 400 connected to the second collector 300b because unintended retraction of the rod 406 due to a loss of air pressure may cause the shoe arm 320 to drop out of contact with the under-running third rail 920.

Figure 14:
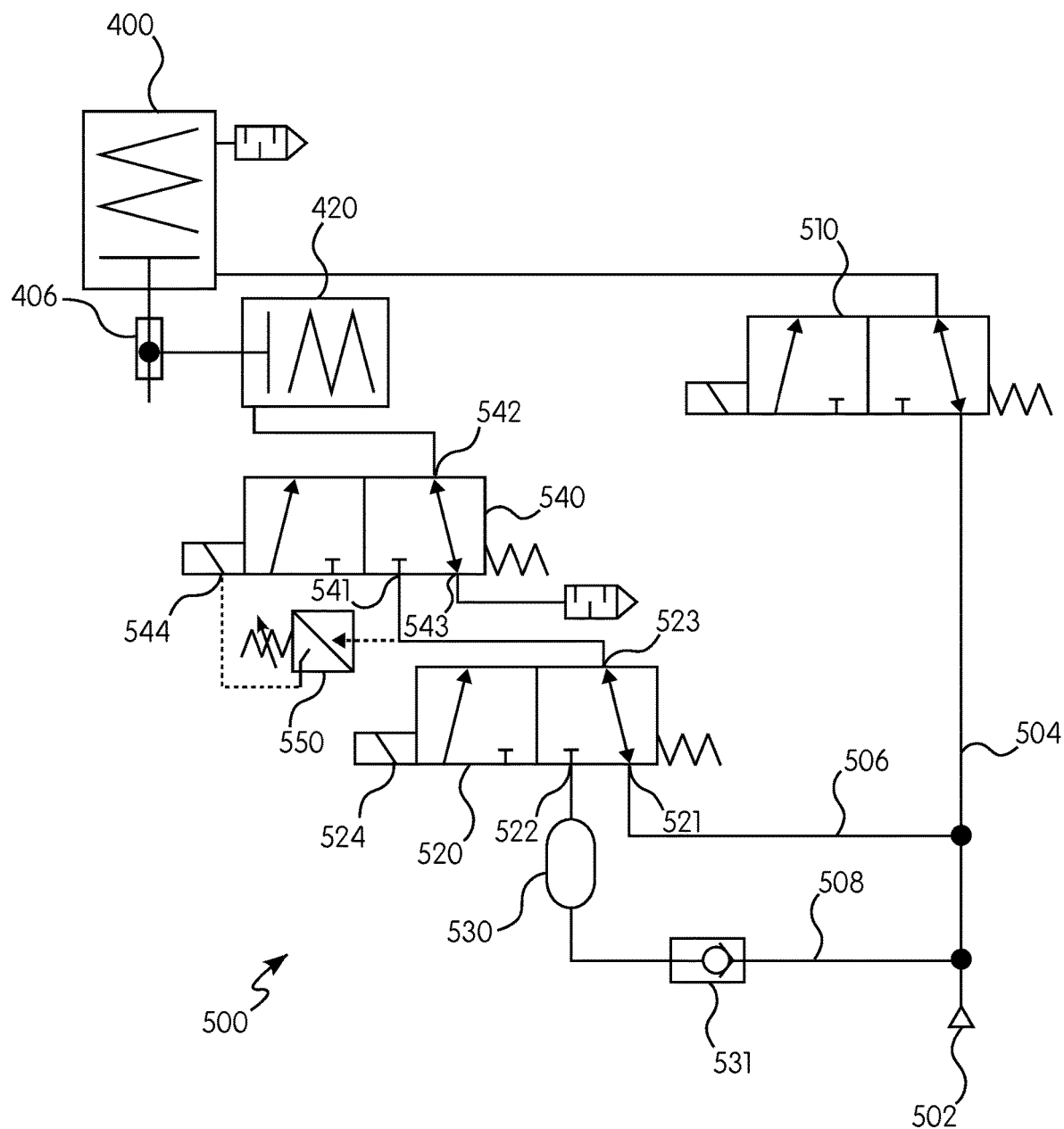
FIG. 14 is a schematic representation of a non-limiting embodiment of a pneumatic circuit for a rod lock of the current collecting device of FIG. 3.

Referring now to FIG. 14, the rod lock 420 may be implemented in a pneumatic circuit 500 controlling either or both of the pneumatic cylinders 400. The pneumatic circuit 500 may include an air source 502 which supplies air to the pneumatic circuit 500. The air source 502 may be, for example, a compressor onboard the rail vehicle. The air source 502 supplies air to three paths. A first path 504 runs from the air source 502 to a cylinder control valve 510 which, in turn, is connected to the pneumatic cylinder 400. The cylinder control valve 510 may be any suitable valve known in the art for controlling a pneumatic cylinder. The cylinder control valve 510 is switchable between a first state which causes the rod 406 of the pneumatic cylinder 400 to extend, and a second state which causes the rod 406 of the pneumatic cylinder 400 to retract.

The second path 506 supplied with air from the air source 502 runs directly to a first inlet port 521 of the rod lock override control valve 520. The third path 508 supplied with air from the air source 502 runs to a reservoir 530 which connects to a second inlet port 522 of the rod lock override control valve 520. An outlet port 523 of the rod lock override control valve 520 is connected to a first inlet port 541 of a rod lock dump valve 540, which in turn is connected to the rod lock 420.

The rod lock override control valve 520 is switchable between a first state (as shown in FIG. 14) in which the first inlet port 521 is in fluid communication with the outlet port 523, and a second state in which the second inlet port 522 is in fluid communication with the outlet port 523. The rod lock override control valve 520 may be switched between the first state and second state by, for example, a solenoid 524 connected to a processor of a control unit (not shown) of the rail vehicle.

As discussed above, the outlet port 523 of the rod lock override control valve 520 is connected to the first inlet port 541 of the rod lock dump valve 540. The rod lock dump valve 540 is switchable between a first state and a second state. In the first state, the first inlet port 541 is in fluid communication with the rod lock 420 via an outlet port 542 of the rod lock dump valve 540. In the second state (shown in FIG. 14), the outlet port 542 of the rod lock dump valve 540 is in fluid communication with an exhaust port 543. The rod lock dump valve 540 may be switched between the first state and the second state by a solenoid 544 activated by a pressure switch 550 in fluid communication with the outlet port 523 of the rod lock override control valve 520.

The rod lock pneumatic circuit 500 is configured to control operation of the rod lock 420, particularly in the event of a failure of the air source 502. The pressure switch 550 detects air pressure at the outlet port 523 of the rod lock override control valve 520. If the detected air pressure is below a predetermined value, indicating a failure of the air source 502, the pressure switch 550 activates the solenoid 544 to switch the rod lock dump valve 540 to the second state in which the outlet port 542 of the rod lock dump valve 540 is in fluid communication with an exhaust port 543. As such, the rod lock 420, which is in fluid communication with the outlet port 542 of the rod lock dump valve 540, is vented to atmospheric pressure. The rod lock 420 detects the absence of air pressure and automatically engages the rod 406 of the pneumatic cylinder 400 to prevent extension/retraction of the rod 406. In this manner, the collector 300, controlled by the pneumatic cylinder 400 equipped with the rod lock 420, is prevented from disengaging the third rail 910, 920 in the event of failure of the air source 502.

If the rod lock override control valve 520 is switched to the first state in which the outlet port 523 is in fluid communication with the first inlet port 521, activation of the rod lock 420 as described above is essentially immediate upon the failure of the air source 502. That is, because the first inlet port 521 is directly connected to the air source via the second path 506, the pressure switch 550 detects failure of the air source 502 as soon as the air pressure (or lack thereof) propagates through the second path 506 and the rod lock override control valve 520. Once air pressure returns from the air source 502, the pressure switch 550 switches the rod lock dump valve 540 back to the first state, such that the rod lock 420 is in fluid communication with the rod lock override control valve 520, and the rod lock 420 is automatically deactivated.

If the rod lock override control valve 520 is switched to the second state in which the outlet port 523 is in fluid communication with the second inlet port 522, activation of the rod lock 420 is delayed due the presence of the reservoir 530 between the air source 502 and the pressure switch 550. That is, in the event of failure of the air source 502, the reservoir 530 maintains air pressure at the rod lock override control valve 520 above the predetermined value at which the pressure switch 550 activates the solenoid 544, at least for a limited time. A check valve 531 isolates the reservoir 530 and the remaining downstream components from losing air pressure back through the failed air source 502. As the reservoir 530 gradually loses air pressure, the rod lock 420 remains deactivated until the air pressure detected by pressure switch 550 drops below the predetermined value at which the pressure switch 550 activates the solenoid 544. The rod 406 of the pneumatic cylinder 400 is thus not held in position, as the air source 502 is not supplying air pressure to the cylinder 400 and the rod lock 420 is deactivated. The pneumatic cylinder 400 may be equipped with a spring-extend feature, as known in the art, which biases the rod 406 of the pneumatic cylinder 400 toward the extended position when no air is supplied to the cylinder 400. As the rod 406 extends due to the spring-extend feature, the collector 300 is raised. If the air pressure detected by the pressure switch 550 subsequently drops below the predetermined value causing the pressure switch to activate the solenoid 544 of the rod lock dump valve 540, the rod lock dump valve 540 is switched to the second state, activating the rod lock 420 to hold the rod 406 of the pneumatic cylinder 400 in the now-extended position. Once air pressure returns from the air source 502, the pressure switch 550 switches the rod lock dump valve 540 back to the first state, such that the rod lock 420 is in fluid communication with the rod lock override control valve 520, and the rod lock 420 is automatically deactivated. Restoration of the air source 502 also causes the cylinder control valve 510 to retract the pneumatic cylinder 400.

Figure 15:
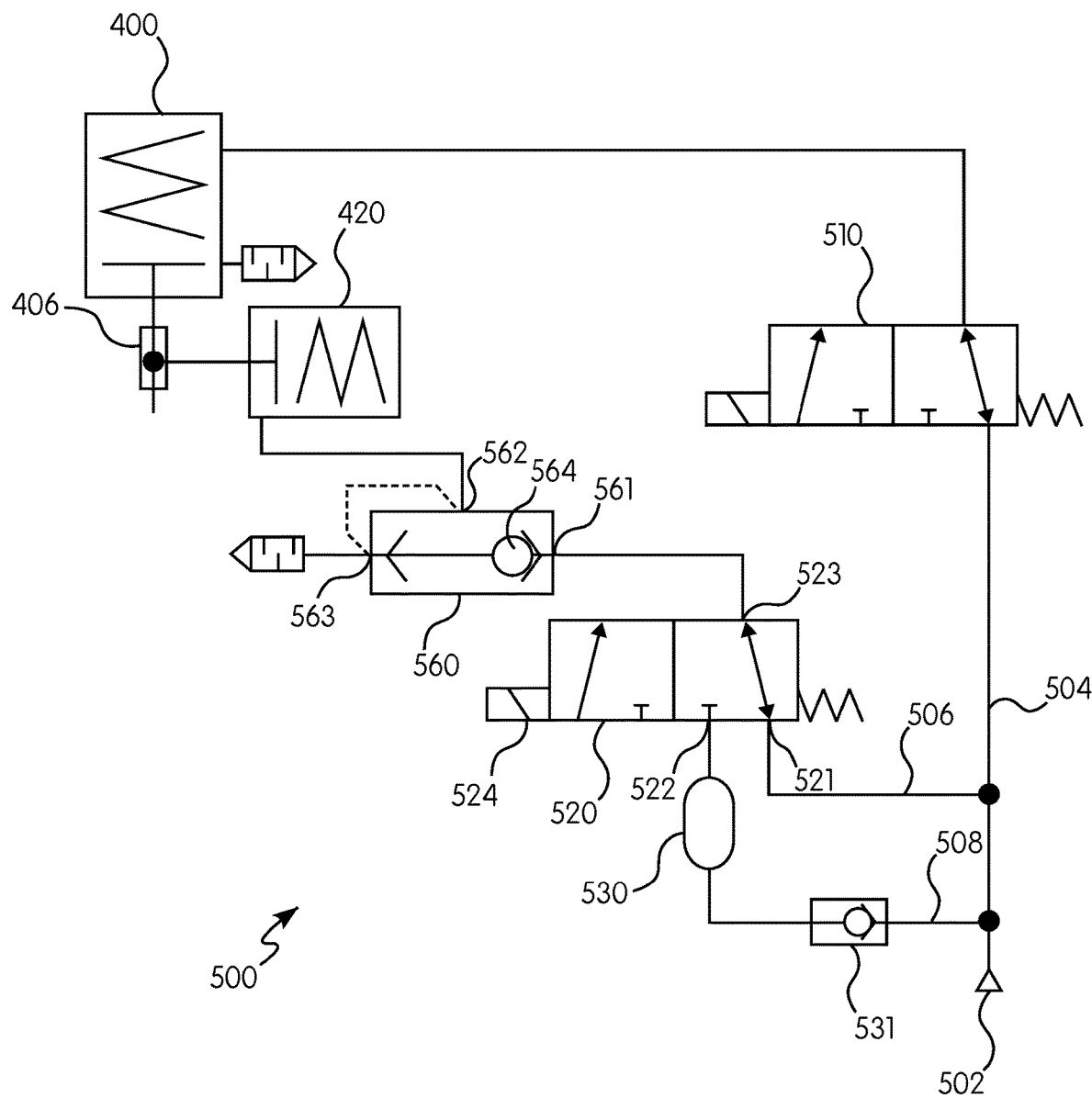
FIG. 15 is a schematic representation of another non-limiting embodiment of a pneumatic circuit for a rod lock of the current collecting device of FIG. 3.

Another non-limiting embodiment of the rod lock pneumatic circuit 500 is shown in FIG. 15. The embodiment of FIG. 15 is similar to the embodiment of FIG. 14, except that the rod lock dump valve 540 and the pressure switch 550 are replaced by a shuttle valve 560. Only the differences between the embodiments of FIGS. 14 and 15 will be discussed in detail. The shuttle valve 560 has an inlet port 561 connected to the outlet port 523 of the rod lock override control valve 520, an outlet port 562 connected to the rod lock 420, and an exhaust port 563 connected to atmospheric pressure. The shuttle valve 560 may be a conventional shuttle valve as known in the art. A pressure-responsive sliding element 564, such as a spring-biased ball or slug, is moveable within the shuttle valve 560 to regulate fluid communication between the inlet port 561, the outlet port 562, and the exhaust port 563. If air pressure above a predetermined threshold is received at the first inlet port 561, the sliding element 564 moves to a first position allowing fluid communication between the first inlet port 561 and the outlet port 562, while isolating the exhaust port 563 from the inlet port 561 and the outlet port 562. If the air pressure received at the inlet port 561 is below the predetermined threshold, the sliding element 564 moves to a second position allowing fluid communication between the exhaust port 563 and the outlet port 562, while isolating the inlet port 561 from the exhaust port 563 and the outlet port 562.

The shuttle valve 560 behaves in substantially the same manner as the rod lock dump valve 540 and the pressure switch 550 of FIG. 14. If air pressure received at the inlet port 561 is below the predetermined threshold, indicating a failure of the air source 502, the rod lock 420, which is in fluid communication with the outlet port 542 of the rod lock dump valve 540, is vented to atmospheric pressure via the exhaust port 563. The rod lock 420 detects the absence of air pressure and automatically engages the rod 406 of the pneumatic cylinder 400 to prevent extension/retraction of the rod 406. In this manner, the collector 300, controlled by the pneumatic cylinder 400 equipped with the rod lock 420 is prevented from disengaging the third rail 910, 920 in the event of failure of the air source 502. The rod lock override valve 520 functions in the same manner as in the embodiment of FIG. 14.

It is to be understood that the particular mounting arrangement and operation of the pneumatic cylinders 400 relative to the mounting frame and the collectors 300*a*, 300*b* is not to be construed as limiting. As described above with reference to the non-limiting embodiment shown in the drawings, extension of the pneumatic cylinders 400 causes the collectors 300*a*, 300*b* to rotate upward, while retraction of the pneumatic cylinders 400 causes the collectors 300*a*, 300*b* to rotate downward. In other embodiments, the cylinder tab 318 of one or both collectors 300*a*, 300*b* may be relocated to the opposite side of the collector pivot shaft 230 such that the pneumatic cylinder 400 is retracted to drive the collectors 300*a*, 300*b* upward and extended to drive the collectors downward. In other non-limiting embodiments, the first end 402 of one or both of the pneumatic cylinders 400 may be relocated to the opposite side of the collector pivot shaft 230 such that the pneumatic cylinder 400 is retracted to drive the collectors 300*a*, 300*b* upward and extended to drive the collectors downward.

Figure 16:
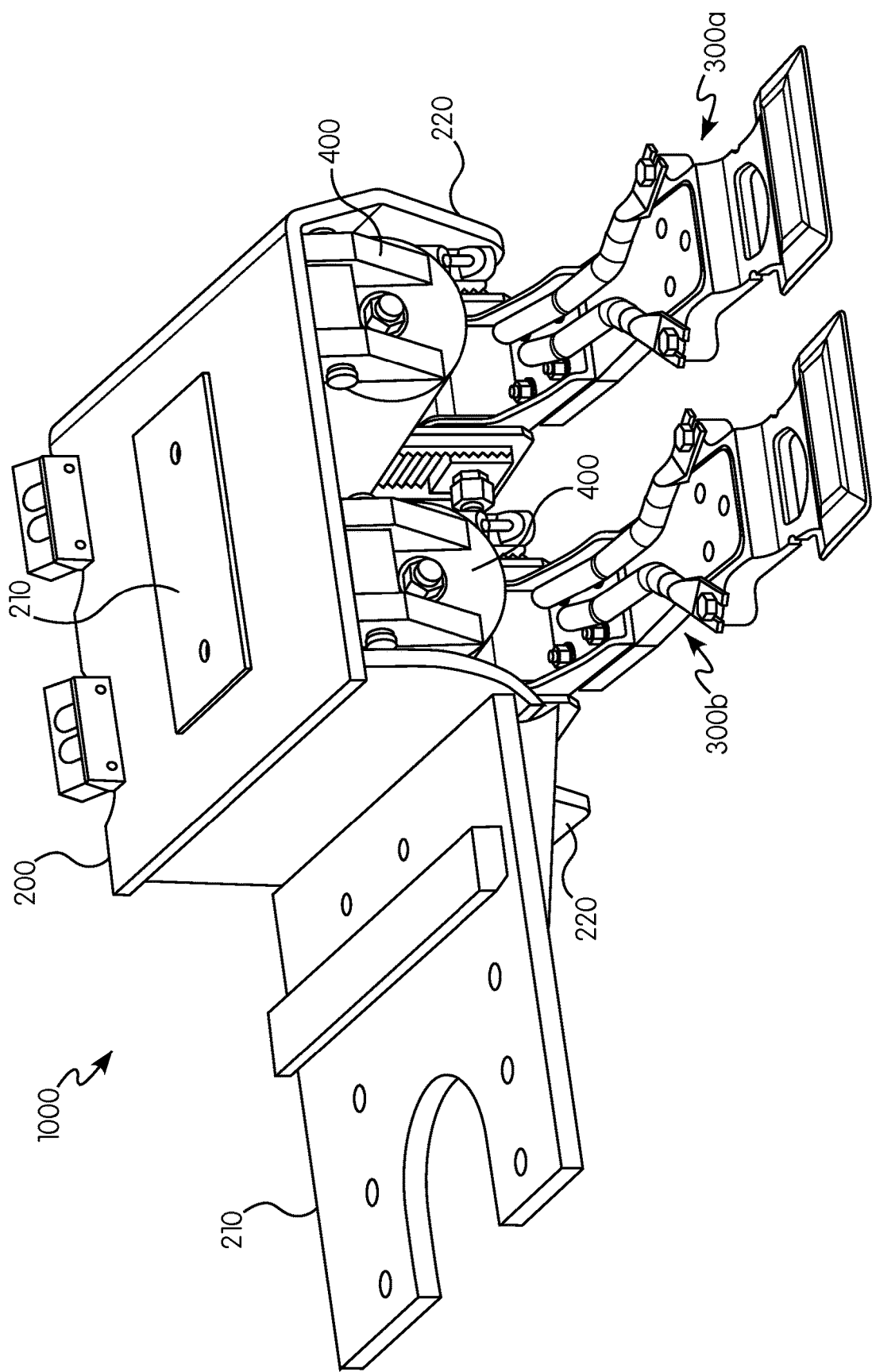
FIG. 16 is a perspective view of another non-limiting embodiment of a current collecting device of the present invention.

Referring now to FIG. 16, another non-limiting embodiment of a current collecting device 1000 is shown. The current collecting device 1000 of FIG. 15 is substantially identical to the embodiment shown in FIG. 3 except for changes to the layout of the mounting frame 200. It is to be further understood that the pneumatic cylinders 400 represent only a non-limiting embodiment of the present invention, and other non-limiting embodiments may utilize hydraulic cylinders, linear actuators, or like components in place of the pneumatic cylinders 400 to achieve the functionality described herein. In still other non-limiting embodiments, electric motors or the like may be coupled to the collectors 300*a*, 300*b* and/or coupled to the collector pivot shaft 230 to rotate the collectors 300*a*, 300*b* relative to the mounting frame 200.

Further examples of the present disclosure will now be described.

A dual mode current collector comprising a mounting frame for attachment to a rail vehicle. The mounting frame includes a plurality of legs and a pivot shaft extending between the legs along a pivot axis. The dual mode current collector also includes a first current collector, which includes a first housing pivotally connected to the pivot shaft of the mounting frame, a first shoe arm connected to the first housing, and a first shoe attached to the first shoe arm. The first shoe has at least one conductor surface that may engage a top side of an over-running rail. The dual mode current collector also includes a second current collector that includes a second housing pivotally connected to the pivot shaft of the mounting frame, a second shoe arm connected to the second housing, and a second shoe attached to the second shoe arm. The second shoe has at least one conductor surface configured to engage an underside of an under-running rail. The dual mode current collector also includes a first actuator connected to the mounting frame and to the first current collector. The first actuator may rotate the first current collector about the pivot axis. The dual mode current collector also includes a second actuator connected to the mounting frame and to the second current collector. The second actuator may rotate the second current collector about the pivot axis.

The first current collector may rotate about the pivot axis independently of the second current collector. Each of the first shoe and the second shoe has an upper conductor surface and a lower conductor surface. At least one of the first actuator and/or the second actuator includes a pneumatic cylinder. The pneumatic cylinder may include a rod lock that may engage a rod of the pneumatic cylinder to prevent extension and retraction of the rod. The pneumatic cylinder may be mounted to the mounting frame and to the first housing such that extension of the pneumatic cylinder raises the first current collector away from the over-running rail and retraction of the pneumatic cylinder lowers the first current collector toward the over-running rail. The pneumatic cylinder may be mounted to the mounting frame and to the second housing such that extension of the pneumatic cylinder raises the second current collector toward the under-running rail and retraction of the pneumatic cylinder lowers the second current collector away from the under-running rail. The first current collector may also include a torsion element connecting the first shoe arm to the first housing. The torsion element may permit radial deflection of the first shoe arm relative to the first housing.

The torsion element may have a polygonal outer surface, and the torsion element may be disposed in a polygonal bore of the shoe arm. The torsion element may be connected to the first housing via an arm pivot shaft rotationally fixable relative to the first housing. The arm pivot shaft may be vertically adjustable within a slot defined in the first housing. The rod lock may be implemented in a pneumatic circuit that includes an air source, a rod lock dump valve having a first inlet port in fluid communication with the air source, an outlet port in fluid communication with the rod lock, an exhaust port in fluid communication with atmospheric pressure, and a solenoid configured to switch the rod lock dump valve between a first state in which the first inlet port is in fluid communication with the outlet port and a second state in which the outlet port is in fluid communication with the exhaust port. The pneumatic circuit also can include a pressure switch that may detect air pressure received at the first inlet port and, based on the pressure detected, actuate the solenoid to switch the rod lock dump valve between the first state and the second state. With the rod lock dump valve in the second state, the rod lock may engage the rod of the pneumatic cylinder. The pneumatic circuit also may include a rod lock override control valve having a first inlet port in fluid communication with the air source, a second inlet port in fluid communication with a reservoir, an outlet port in fluid communication with the first inlet port of the rod lock dump valve, and a solenoid that may switch the rod lock override control valve between a first state in which the first inlet port is in fluid communication with the outlet port and a second state in which the second inlet port is in fluid communication with the outlet port.

The rod lock may be implemented in a pneumatic circuit that includes an air source and a shuttle valve having an inlet port in fluid communication with the air source, an outlet port in fluid communication with the rod lock, an exhaust port in fluid communication with atmospheric pressure, and a sliding element moveable between a first position and a second position based on air pressure received at the inlet port. In the first position of the sliding element, the inlet port may be in fluid communication with the outlet port and the exhaust port is isolated. In the second position of the sliding element, the outlet port is in fluid communication with the exhaust port and the inlet port is isolated. With the sliding element in the second position, the rod lock may engage the rod of the pneumatic cylinder. The pneumatic circuit also can include a rod lock override control valve having a first inlet port in fluid communication with the air source, a second inlet port in fluid communication with a reservoir, an outlet port in fluid communication with the inlet port of the shuttle valve, and a solenoid that may switch the rod lock override control valve between a first state in which the first inlet port is in fluid communication with the outlet port and a second state in which the second inlet port is in fluid communication with the outlet port.

A dual mode current collector can include a mounting frame for attachment to a rail vehicle and a plurality of current collectors. Each of the current collectors includes a housing pivotally connected to the mounting frame, a shoe arm connected to the housing, and a shoe attached to the shoe arm. The shoe has at least one conductor surface that may engage a rail. The dual mode current collector also may include a plurality of pneumatic cylinders, with each of the plurality of pneumatic cylinders connected to the mounting frame and to one of the current collectors. Each of the pneumatic cylinders may rotate the current collector to which the cylinder is connected relative to the mounting frame. The shoe of at least one of the current collectors may engage a top side of an over-running rail. The shoe of at least one of the current collectors may engage an underside of an under-running rail.

Each of the current collectors may rotate relative to the mounting frame independently of the others of the current collectors. A first of the current collectors may engage the top side of the over-running rail via retraction of a first of the pneumatic cylinders connected to the first of the current collectors. A second of the current collectors may engage the underside of the under-running rail via extension of a second of the pneumatic cylinders connected to the second of the current collectors. The second of the pneumatic cylinders may include a rod lock that may prevent extension and retraction of a rod of the second of the pneumatic cylinders.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what are currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

What is claimed is:

1. A dual mode current collector, comprising:
a first current collector, comprising:
a first housing configured to be connected with a vehicle;
a first shoe arm connected to the first housing; and
a first shoe attached to the first shoe arm, the first shoe having a first conductor surface configured to engage a top side of a first conductive body; and
a second current collector, comprising:
a second housing configured to be connected with the vehicle;
a second shoe arm connected to the second housing; and
a second shoe attached to the second shoe arm, the second shoe having a second conductor surface configured to engage an underside of a second conductive body,
the first shoe configured to rotate in a first direction toward the top side of the first conductive body, the second shoe configured to rotate in a second direction toward the underside of the second conductive body, the first direction and the second direction being opposite each other.

2. The dual mode current collector of claim 1, wherein each of the first housing and the second housing is configured to be pivotally connected to the vehicle.

3. The dual mode current collector of claim 1, further comprising:
a first actuator configured to be connected to the vehicle and to the first current collector, the first actuator configured to rotate the first shoe in the first direction downward toward the top side of the first conductive body; and
a second actuator configured to be connected to the vehicle and to the second current collector, the second actuator configured to rotate the second shoe in the second direction upward toward the underside of the second conductive body.

4. The dual mode current collector of claim 3, wherein at least one of the first actuator or the second actuator comprises an extendible rod.

5. The dual mode current collector of claim 4, wherein the at least one of the first actuator or the second actuator comprises a rod lock configured to engage the extendible rod to limit extension and retraction of the extendible rod.

6. The dual mode current collector of claim 5, further comprising:
a dump valve having an inlet port in fluid communication with an air source;
an outlet port in fluid communication with the rod lock;
an exhaust port in fluid communication with atmospheric pressure;
a solenoid configured to switch the dump valve between a first state in which the inlet port is in fluid communication with the outlet port and a second state in which the outlet port is in fluid communication with the exhaust port; and
a pressure switch configured to detect air pressure received at the inlet port and, based on the air pressure that is detected, actuate the solenoid to switch the dump valve between the first state and the second state,
wherein the rod lock is configured to engage the rod lock while the solenoid is in the second state.

7. The dual mode current collector of claim 6, wherein the inlet port is a first inlet port, the outlet port is a first outlet port, the solenoid is a first solenoid valve, and further comprising:
a control valve having a second inlet port in fluid communication with the air source;
a third inlet port in fluid communication with a reservoir;
a second outlet port in fluid communication with the first inlet port of the dump valve; and
a second solenoid configured to switch the control valve between a third state in which the first inlet port is in fluid communication with the second outlet port and a fourth state in which the third inlet port is in fluid communication with the second outlet port.

8. The dual mode current collector of claim 5, further comprising:
a shuttle valve having an inlet port configured to be in fluid communication with an air source;
an outlet port in fluid communication with the rod lock;
an exhaust port in fluid communication with atmospheric pressure; and
a sliding element moveable between a first position and a second position based on air pressure received at the inlet port;
wherein the inlet port is in fluid communication with the outlet port and the exhaust port is isolated while the sliding element is in the first position,
wherein the outlet port is in fluid communication with the exhaust port and the inlet port is isolated while the sliding element is in the second position.

9. The dual mode current collector of claim 8, wherein the rod lock is configured to engage the rod lock while the sliding element is in the second position.

10. The dual mode current collector of claim 9, wherein the inlet port is a first inlet port, the outlet port is a first outlet port, and further comprising:
a control valve having a second inlet port in fluid communication with an air source, a third inlet port in fluid communication with a reservoir, a second outlet port in fluid communication with the first inlet port, and a solenoid configured to switch the control valve between a first state in which the second inlet port is in fluid communication with the second outlet port and a second state in which the third inlet port is in fluid communication with the second outlet port.

11. The dual mode current collector of claim 4, wherein the at least one of the first actuator or the second actuator is configured to extend the extendible rod to raise the first current collector away from the first conductive body, the at least one of the first actuator or the second actuator configured to retract the extendible rod to lower the first current collector toward the first conductive body.

12. The dual mode current collector of claim 1, wherein the first current collector is configured to rotate independent of rotation of the second current collector.

13. The dual mode current collector of claim 1, wherein the first conductor surface of the first shoe is a first lower conductor surface and the second conductor surface of the second shoe is a first upper conductor surface, the first shoe also having a second lower conductor surface, the second shoe also having a second upper conductor surface.

14. The dual mode current collector of claim 1, wherein the first current collector further comprises:
a torsion element connecting the first shoe arm to the first housing, the torsion element configured to permit radial deflection of the first shoe arm relative to the first housing.

15. The dual mode current collector of claim 14, wherein the torsion element has a polygonal outer surface is disposed in a polygonal bore of the first shoe arm.

16. The dual mode current collector of claim 14, wherein the torsion element is connected to the first housing via an arm shaft rotationally fixable relative to the first housing.

17. The dual mode current collector of claim 16, wherein the arm shaft is vertically adjustable within a slot defined in the first housing.

18. A dual mode current collector, comprising:
first and second current collectors, each of the first and second current collectors comprising:
  a housing connected to a mounting frame;
  a shoe arm connected to the housing; and
  a shoe attached to the shoe arm, the shoe having at least one conductor surface configured to engage one or more of a first conductive body or a second conductive body,
wherein the shoe of the first current collector is configured to rotate downward to engage a top side of the first conductive body, and
wherein the shoe of the second current collector is configured to rotate upward to engage an underside of the second conductive body.

19. The dual mode current collector of claim 18, wherein each of the first and second current collectors is configured to independently rotate relative to the mounting frame independently of each other.

20. A dual mode current collector, comprising:
a first current collector that includes a first housing, a first shoe arm connected to the first housing, and a first shoe attached to the first shoe arm, the first shoe having a first conductor surface and configured to rotate downward to engage a top side of a first conductive body; and
a second current collector that includes a second housing, a second shoe arm connected to the second housing, and a second shoe attached to the second shoe arm, the second shoe having a second conductor surface and configured to rotate upward to engage an underside of a second conductive body.

\* \* \* \* \*